United States Patent [19]

Monroe, Jr.

[11] 4,040,903
[45] Aug. 9, 1977

[54] THERMIONIC ENERGY CONVERTERS

[75] Inventor: James E. Monroe, Jr., Timonium, Md.

[73] Assignee: The United States of America as represented by the United States Energy Research and Development Administration, Washington, D.C.

[21] Appl. No.: 502,420

[22] Filed: Sept. 3, 1974

Related U.S. Application Data

[63] Continuation of Ser. No. 384,080, July 21, 1964.

[51] Int. Cl.² .............................................. G21C 3/02
[52] U.S. Cl. ...................................... 176/39; 176/68; 176/91 R; 176/83; 310/306
[58] Field of Search ............. 310/4; 176/39, 68, 91 R, 176/83

[56] References Cited

U.S. PATENT DOCUMENTS

| | | | |
|---|---|---|---|
| 3,113,091 | 12/1963 | Rasor et al. | 176/39 |
| 3,184,392 | 5/1965 | Blake | 176/83 |
| 3,201,619 | 8/1965 | Gleason et al. | 176/39 |
| 3,215,868 | 11/1965 | Pidd et al. | 176/39 |
| 3,243,350 | 3/1966 | Lustman et al. | 176/91 R |
| 3,330,974 | 7/1967 | Wilson | 310/4 |
| 3,759,787 | 9/1973 | McDonald | 176/91 R |

Primary Examiner—Harvey E. Behrend
Attorney, Agent, or Firm—Fleit and Jacobson

[57] ABSTRACT

A thermionic device for converting nuclear energy into electrical energy comprising a tubular anode spaced from and surrounding a cylindrical cathode, the cathode having an outer emitting surface of ruthenium, and nuclear fuel on the inner cylindrical surface. The nuclear fuel is a ceramic composition of fissionable material in a metal matrix. An axial void is provided to collect and contain fission product gases.

2 Claims, 4 Drawing Figures

INVENTOR
James E. Monroe, Jr.

INVENTOR
James E. Monroe, Jr.

BY
Burns, Doane, Benedict, Swecker, & Mathis
ATTORNEYS

THERMIONIC ENERGY CONVERTERS

This is a continuation application of Ser. No. 384,080 filed July 21, 1964 of JAMES E. MONROE, JR.

This invention relates to thermionic energy converters and more particularly to thermionic diodes for the conversion of the nuclear energy of fissionable materials into electrical energy.

The design criteria upon which the thermionic performance of a thermionic diode is based are determined principally by factors such as the nature of the cathode material, the spacing between the anode and cathode, the pressure, composition, and purity of the ionizable vapor, if any, between the anode and cathode, the cathode temperature, and the anode temperature. If these design criteria are compromised by the use of nuclear fuels as a primary energy source, the performance and life of the resulting energy converter may be profoundly degraded. It is precisely for the reason that prior efforts at fueling thermionic diodes with fissionable materials have compromised these design criteria that nuclear-fueled thermionic diodes have not attained a high degree of practicality.

It is therefore a general object of this invention to provide a new, improved and practical construction for a thermionic diode which employs fissionable fuel as its primary source of energy.

The process by which large amounts of energy are released through nuclear fission reactions is now quite well known. In general, a fissionable atom absorbs a neutron in its nucelus and undergoes a nuclear disintegration. This nuclear disintegration produces fission products of lower atomic weight having great kinetic energy, and two or more neutrons also having high energy. The kinetic energy of the fission products is quickly dissipated in the fuel as heat. If, after this heat generation, there is at least one net neutron remaining which induces a subsequent fission, the fission reaction becomes self-sustaining and the heat generation is continuous.

Some prior proposals for the employment of fissionable fuels in thermionic diodes have involved the use of the fuel material itself as the cathode, an expedient which simplifies the construction of the thermionic diode, but only at great sacrifice to its performance. Uranium bearing compounds are not considered optimum choices as cathode compositions. The exposure of the fissionable material to the rarefied metal vapors typically employed in thermionic diodes results in contamination of the anode, the ionization vapor and the thermionic plasma by fission products, thereby altering the electrical characteristics of the thermionic energy converter and reducing the power output obtainable from it.

The spacing between the anode and cathode in a thermionic diode is a particularly critical factor. Variations in this spacing, particularly non-uniform variations, by altering the internal power distribution in the diode degrade the electrical characteristics and shorten the life of the diode. Should the space between the anode and cathode become too small, a short develops through the diode destroying its utility.

The fuel forms heretofore proposed for use in thermionic diodes have often contributed to the difficulty of maintaining the anode-cathode spacing both uniform and constant. By most standards the range of useful cathode temperatures in thermionic diodes is high. This temperature must, of course, be supplied by the fuel. However, because of the typically low thermal conductivity of most nuclear fuels and because of the resulting high thermal gradients created within the body of the fuels, the temperatures generated at the center of the fuel material are usually very much higher than those produced at the surface of the fuel. Consequently, the internal temperatures of the nuclear fuels employed in prior nuclear-fueled thermionic diodes are very much higher than the temperatures produced at the surface of the cathode. These high internal temperatures tax the limits of materials employed in the diodes and make difficult the maintenance of critical dimensions between the cathode and anode. In addition, these high internal temperatures also result in the release of potentially contaminating fission gases at greatly increased rates. Approximately one atom of fission gas is generated for every three atoms of uranium fissioned. At lower temperatures most of the fission gas is trapped within the crystal lattice or structure of the fuel solid. These gases are released at rates which are temperature dependent in an exponential relationship. It is therefore especially important to keep the internal temperature of the fuel solid as low as possible consistent with the practical effects to be obtained. A still further consequence of high thermal gradients in the nuclear fuel solids employed in prior thermionic diodes is the difficulty of maintaining the cathode temperature within an optimum operating range.

It is a more specific object of this invention to provide nuclear-fueled thermionic diodes of an improved construction in which a predetermined electrode spacing may be maintained within close limits throughout the life of the diodes and in which the power density is substantially uniform over the anode and cathode surfaces.

A still further object of this invention is to provide improved nuclear-fueled thermionic diodes in which the thermionic plasma is substantially free of contaminating fission products.

Yet another object of the invention is to provide thermionic diodes incorporating nuclear fuel solids therein having a relatively low thermal gradient through the body of the fuel solids to effect a reduction of potentially destructive internal temperatures, a low rate of fission gas release, consistent interelectrode spacing, and close control of cathode temperatures.

One form of the invention in which these and other objects are realized includes a hollow cylindrical container formed of a refractory metal. This container functions as a cathode structure and has a sealed interior chamber therein. A hollow bushing of a fuel solid with an axial void therein is positioned within the interior chamber. That portion of the interior chamber in the cathode not occupied by the fuel solid is evacuated. The fuel solid itself comprises particles of a fissionable-material containing ceramic compound dispersed within a continuous matrix or phase of metal and is metallurgically bonded to the internal walls of the chamber in the cathode. The cylindrical cathode structure is suspended within an outer cylindrical anode spaced inwardly from the walls thereof to leave a small interelectrode gap within which may be provided a low-pressure vapor of an alkali or alkaline earth metal when the diode is in operation. This structure results in a relatively low centerline temperature within the fuel solid, a low thermal gradient through the fuel solid, and containment of fission gases released by the fuel solid.

In addition, because the fuel solid has a lower modulus of elasticity than that of the refractory metal cathode, any changes in dimension of the fuel solid resulting from thermal stresses or entrapped fission gases cause an inward flow of the fuel solid into its axial void instead of forcing the cathode structure to bulge outward and alter the interelectrode gap.

Although the scope of the invention is defined in the claims appended hereto, further details of the invention and its execution as well as additional objects and advantages will be more fully understood with reference to the following more detailed description taken together with the annexed drawings wherein:

Figure 1:
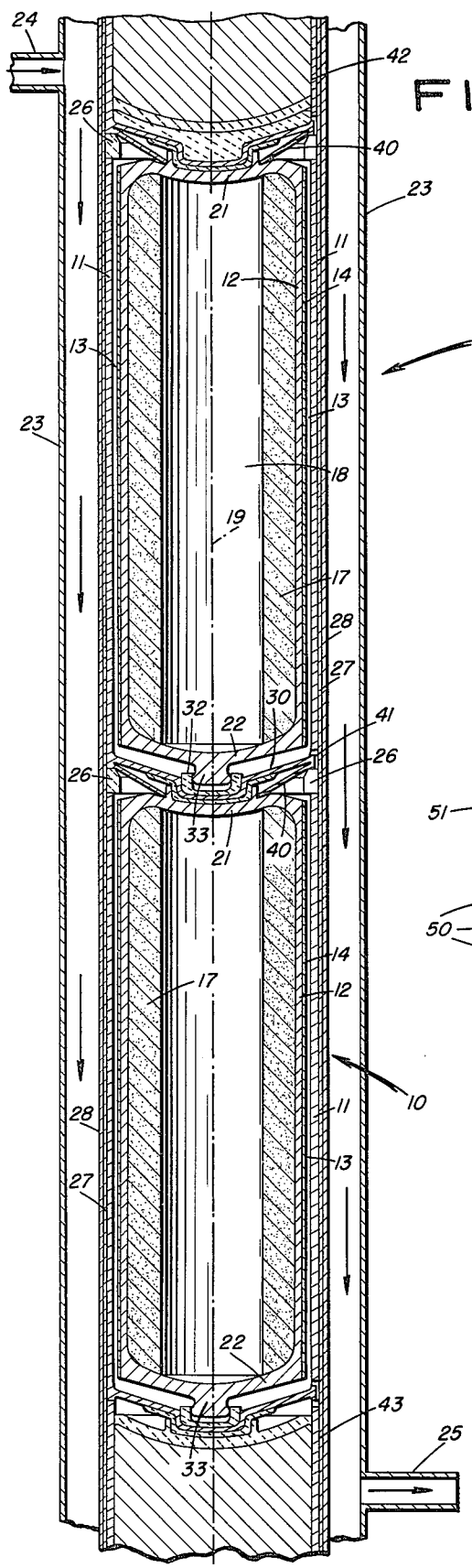
FIG. 1 is a longitudinal cross-sectional view of a preferred form of thermionic energy converter employing series-connected nuclear-fueled thermionic diodes constructed in accordance with this invention.
Figure 3:
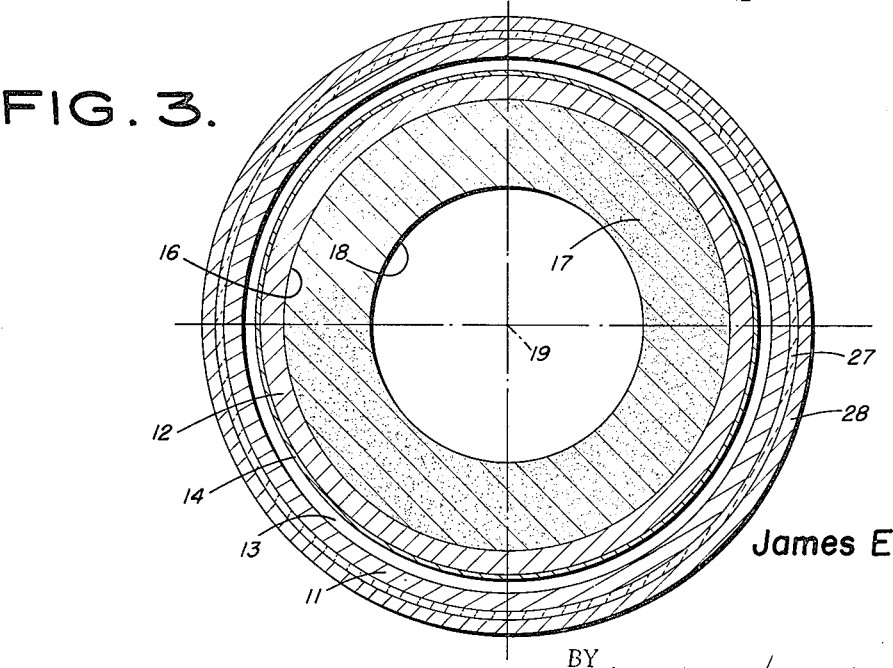
FIG. 3 is a cross-sectional view taken on lines 3-3 of FIG. 2.

FIG. 1 illustrates a longitudinal cross-section of an assembly in which a plurality of thermionic diodes 10 constructed in accordance with this invention are connected in series to combine their respective output potentials. Each of the diodes 10 comprises a cylindrical anode 11 of circular cross-section (see FIG. 3) within which is positioned a concentric cylindrical cathode 12 separated by a narrow interelectrode gap 13. The outer surface of cathode 12 is coated with a layer of emitter material 14 to promote thermionic emission from the cathode 12 and thereby to effect a current-supporting potential across the interelectrode gap 13.

In operation the interelectrode gap 13 may be filled with an alkali or alkaline earth metal vapor, but preferably cesium, at low vapor pressures. This is achieved by heating a reservoir of liquid cesium, which is in communication with the interelectrode gap 13, to a temperature of from 425° to 625° K. The cesium vapor may, if desired, be circulated through the interelectrode gaps of the diodes 10 from one end of the series to the other and recycled through a filter.

The cathode 12, it is to be noted, is in the form of a hollow fuel container having within itself a sealed chamber 16 in which is located an annular bushing-like fuel solid 17 with an axial void 18 therein. The cathode 12 and fuel solid 17 are symmetrical about centerline 19. The fuel solid 17 is formed of a composition including a major proportion of a fissionable material. Preferably this fuel solid comprises spheroidal particles of ceramic uranium dioxide enriched with $U^{235}$ and dispersed in a refractory metal matrix, such as molybdenum, to raise the thermal conductivity of the fuel solid. The fuel solid 17 is metallurgically bonded to the internal surfaces of the fuel container to promote the transfer of heat developed in the fuel solid through the walls of the cathode 12 to the emitter surface 14 thereon.

In the fabrication of the cathodes 12 it is preferred to effect a union between the annular fuel solid 17 and the cylindrical walls of the container in a gas pressure bonding operation performed with the two components on a center mandrel. Thereafter the center mandrel may be removed by drilling. End caps 21 and 22 are then bonded to the two-part subassembly in a final hot pressing operation carried out in a vacuum to leave the central void 18 evacuated. The end caps 21 and 22 are preferably of hemispheric or ellipsoidal configuration as shown to provide maximum strength for the retention of fission products with an economy in the use of the fuel containing material. Any other fabrication method which would result in a similar structure is, of course, acceptable although the gas pressure bonding technique is believed to be among the most economical.

The use of a hollow bushing fuel form in a sealed cylindrical cathode with an evacuated central void offers several important advantages. Excessive centerline temperatures with their core melting potentialities and fission gas release problems are minimized by the evacuated internal void. There is also a significant reduction in the ultimate pressures generated as the result of fission gas release. In addition, the containment of fission gases within the central void 18 minimizes possible contamination of the cesium vapor which would degrade the ion plasma in the interelectrode gap 13.

Despite the narrowness of the interelectrode gap the anode 11 should remain at a substantially lower temperature than that of the cathode 12 for best results. Therefore, cooling means are provided which are represented in this case by a cooling jack 23 surrounding the anodes 11. A coolant is circulated through the jacket 23 from input port 24 to output port 25 to maintain the anodes at a temperature somewhere between 600° to 1,000° K.

It is necessary that the anodes 11 be electrically isolated from each other. For this purpose annular insulators 26, preferably of $Al_2O_3$ are positioned between adjacent anodes 11 and are sealed to both anodes by a vanadium braze. A layer 27 of electrical insulation, preferably formed of $Al_2O_3$, also surrounds all of the anodes 11. Insulating layer 27 is, however, preferably quite thin, on the order of 0.01 inch, to promote the rapid transfer of heat therethrough. A metal sheath 28 surrounds the insulating layer 27 and is in direct contact with the coolant in jacket 23.

As previously mentioned, the illustrated thermionic diodes 10 are connected in series in the illustrated embodiment of this invention. The means by which the interconnections are accomplished and by which the possibility of arc over between successive diodes is eliminated are not the subject of this invention, but are described more fully and claimed in a copending application Ser. No. 384,079, filed in the name of Edwin Jules and William J. Levedahl on July 21, 1964, now U.S. Pat. No. 3,863,081. Briefly, the structure includes a back-emission shield 30, which has as one of its functions to determine the axial orientation of the cylindrical cathodes 12 on either side of it. Thus, the disc-like emission shield 30 incorporates at the central portion thereof a recess 31 within which is positioned a cup-shaped support member 32 formed of an electrically and thermally insulating material, preferably sintered $Al_2O_3$. An axial extension 33 on the cathode 12 fits tightly and precisely within the bore 34 formed in the insulating support member. The interelectrode gap 13, and particularly its uniformity, is determined in part by the precision of the centering of the cathode extension 33 within the central bore 34 in the insulating member 32.

The configuration of the back-emission shield 30 which provides the recess 31 on one side of the shield results in a dome-like knob 35 on the opposite surface. Over this knob is fitted a plate-like layer 36 of an insulating material. This latter layer 36 fits within the flanged ring 37 projecting symmetrically from one end of the next succeeding cathode 12. It can thus be seen that the back-emission shield 30 with its insulators 32 and 36 determines the interelectrode gaps 13 surrounding the cathode structures 12 on both sides of it. In this embodiment the roughly conical interelectrode lead 40 is attached to the anode 11 at its point of juncture with the back-emission shield 30 and extends into electrical contact with the end cap 22 of the next succeeding cathode 12.

A tortuous path for the flow of ionization promoting vapors between diodes 10 is provided by one or more channels 41 in communication between adjacent diodes through a portion of the back-emission shield. This tortuous path 41 results in a path between adjacent diodes which is not on a line of sight between respective cathodes 12.

To complete the series connections the topmost of the cathodes 12 as seen in FIG. 1 may be connected through its lead 40 to a circular terminal member 42. At the other end of the series, which may include as many thermionic diodes as desired, the bottommost anode 11 may abut directly against an additional terminal member 43. Terminals 42 and 43 may be connected by means not shown to a load to provide current at a combined potential equal to the sum of the potentials of the diodes in series.

COLLECTOR COMPOSITION

The selection of collector material for the anodes 11 is based primarily on desirable mechanical properties since during operation, the collector temperature, preferably in the range from 600 to 1,000° K, is low enough that virtually complete cesium coverage of the collector is assured for most refractory metals. Niobium is an excellent collector material because of its compatibility with cesium vapor, the close matching of its coefficient of thermal expansion of that of insulating spacers of aluminum oxide and because it is not attacked by liquid metal coolants such as sodium potassium or lithium.

EMITTER COMPOSITION

The choice of an emitter material 14 to coat the cathode 12 has a wide range of consequences. The emitter material, in addition to possessing a high work function to yield the required high output performance, must be durable in its operating environment; thus, it must have the following characteristics at operating temperatures: resistance to corrosion by the ionization vapor, resistance to thermal shock, low vapor pressure to minimize evaporation of the surface, good creep strength, low permeability to fission product gases and limited interdiffusion with the base clad material or fuel matrix material.

Most of the refractory metals have adequate combinations of these properties. The group of materials called the refractory metals is generally considered to comprise those metals with melting points equal to or higher than that of chromium. Of the refractory metals, however, the materials ruthenium, iridium, and rhenium have shown marked superiority as thermionic emitters in cesium vapor-filled diodes. For example, with these materials the optimum performance possible includes output power densities ranging from a few watts per square centimeter to over 10 watts per square centimeter, energy conversion efficiencies in the range of 10 to 17%, and emitter temperatures in the range of 1,500° K. This high performance is obtainable with an interelectrode gap of 0.030 inch This spacing is relatively wide according to current thermionic practice using other refractory metals and provides an important advantage of ruthenium, iridium and rhenium from the viewpoint of reliability and lengthened lifetime.

Preferably ruthenium is employed as the emitter material because of its low thermal neutron capture cross-section. The emitter is operated at a surface temperature of approximately 1,700° K with an interelectrode gap of 0.030 inch to obtain superior performance. The energy conversion phenomena underlying the operation of vapor-filled thermionic energy converters is still not completely understood. Current theory indicates, however, that there are at least two possible modes of operation by which the transport of charge is effected between electrodes in thermionic diodes. The two modes of operation are the surface ionization mode of operation, in which the principal mechanism for the generation of ions is ionization at the emitter surface, and the volume ionization mode of operation, in which the principal mechanism for the generation of ions is ionization by collision between energetic electrons and vapor neutrals in the interelectrode gap. It is the latter mode of operation which is of principal importance for good performance in the lower range of emitter temperatures preferred to be employed in the practice of this invention. The surface ionization mode of operation appears to be clearly distinguishable from the volume ionization mode of operation particularly for emitter temperatures of 1,740° K or lower. At higher emitter temperatures there is a tendency for the two modes to merge together.

NATURE OF FUEL-CONTAINING CATHODE

The basic functions of the fuel-containing cathode are threefold. First, it should either be composed of a high work function material to operate as an emitter or it should be capable of accepting an adherent coating of such an emitter material. Second, as the structural member of the cathode it must possess high strength at operating temperatures and, specifically, a higher strength than that of the fuel solid. Third, it must be an effective containment vessel for the fuel solid and the fission products.

To maintain its dimensional stability the fuel containing cathode is preferably formed of a refractory metal having a modulus of elasticity which is greater at operating temperatures than that of the fuel solid. This permits any internal stresses to be relieved by an inward deformation of the fuel solid rather than by outward deformation of the cathode structure. With the fuel composition referred to above, a preferred material for the fuel container consists of molybdenum alloyed with $\frac{1}{2}$% titanium. Satisfactory performance in terms of adequate high temperature strength and resistance to deformation has also been obtained with other refractory metal fuel containing cathodes such as, for example, tantalum alloyed with 10% tungsten; tungsten; and molybdenum alloyed with $\frac{1}{2}$% titanium, 1/10% zirconium and 1/10% carbon. Other refractory metals and alloys thereof may also be found suitable.

FUEL SOLID

The fuel solid preferably used in the practice of this invention is a two-phase cermet system in which ceramic fissionable material-containing particles are intimately associated with a metallic matrix. The dispersion is so arranged that the metal phase is the continuous phase and the ceramic fuel is the discontinuous phase.

Figure 4:
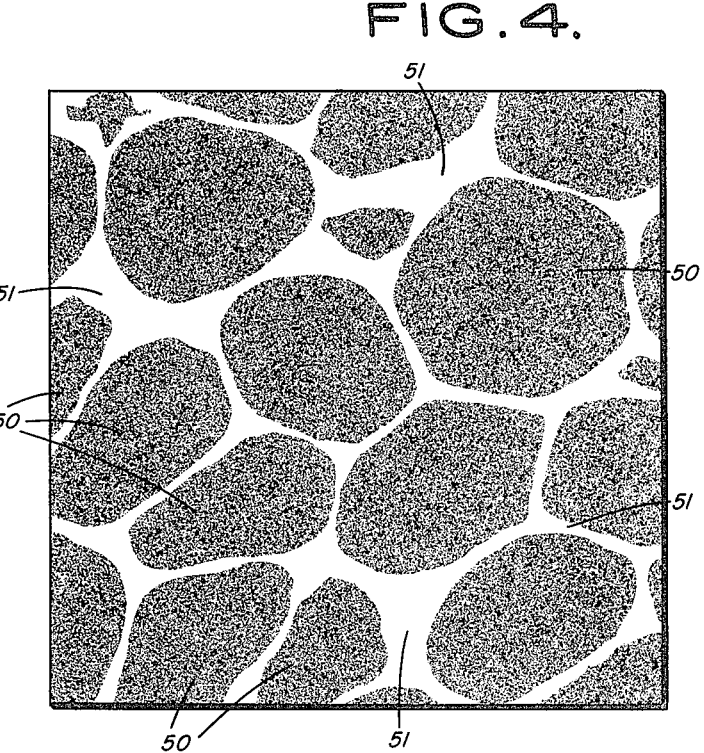
FIG. 4 is a representation of a photomicrograph showing a magnified cross-section of a portion of the fuel solid employed in the structures shown in the preceding figures.
Figure 2:
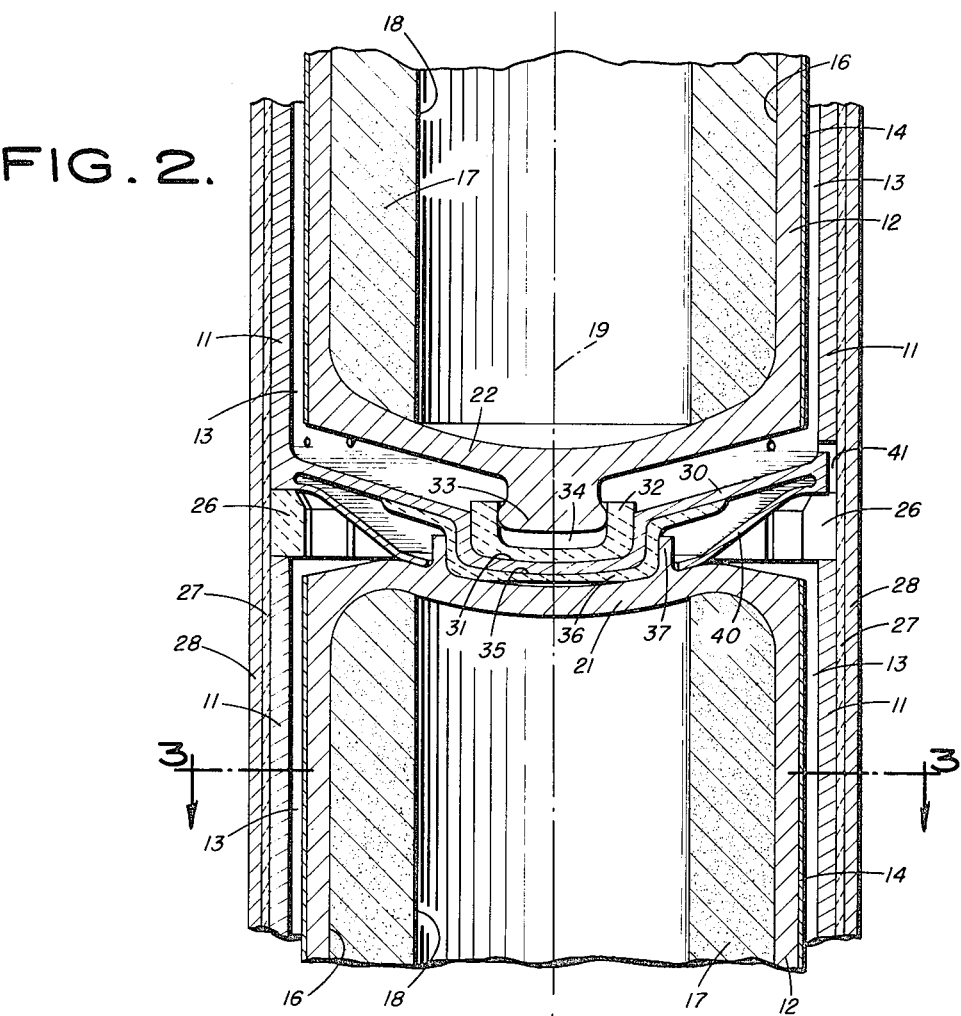
FIG. 2 is an enlarged view of a portion of the structure shown in FIG. 1.

This arrangement maximizes the thermal conductivity of the cermet system. FIG. 4 represents a cross section of the preferred uranium dioxide - molybdenum cermet fabricated from molybdenum-coated spherical uranium dioxide particles 50.

This representation of an actual photomicrograph of a cross-section of the fuel solid illustrates the excellent uniformity of distribution of the metallic phase 51 which is possible in a cermet with high volume percent loading of uranium dioxide. In the sample of fuel solid illustrated in FIG. 4 the uranium dioxide particles 50, enriched with $U^{235}$, comprised approximately 83 volume percent of the fuel solid. The uranium dioxide particles, which were generally spheroidal in shape and ranged in particle size from 100 to 140 mesh, were first coated with molybdenum and then cold pressed at 20 tons per square inch, sintered in Argon for two hours at 2,070° K to form the basic fuel solid, and subsequently hot pressed. This resulted in a uniform dispersion of the particles in a continuous matrix of molybdenum metal.

A critical factor associated with non-vented fuel form systems is the release of fission gases by the fuel and its resultant effect on the dimensional stability of the fuel form system. Release of fission gases by the fuel is a temperature dependent phenomenon that appears to vary within fairly narrow limits for the commonly accepted nuclear thermionic reactor fuels. In general, this critical temperature appears to lie in the area of 1900° K for the most practical nuclear thermionic fuels. Above this temperature the rate of release of fission gases from the crystalline lattice of the fuel becomes a significant factor and increases very rapidly with further increases of temperature.

The use of a continuous metallic matrix surrounding the particles of ceramic $UO_2$ can increase the bulk thermal conductivity of the fuel solid by as much as an order of magnitude. In the example illustrated the thermal conductivity of the composite cermet is approximately eight times the thermal conductivity of sintered uranium dioxide not dispersed in a metallic matrix. Thus the preferred cermet fuel form provides maximum thermal conductivity to the emitter surface and greatly reduces the centerline temperature, thereby reducing the rate at which fission gases are released.

The metal matrix of the fuel solid also improves the physical strength properties of the fuel solid, such as resistance to thermal shock, and acts as an aid in fission product retention. In addition, the metal matrix provides an excellent medium with which to develop a consistently complete metallurgical bonding of the fuel bushing to the refractory metal cladding. This metallurgical bonding of the fuel solid to the cladding is important to maximize the heat transfer from the fuel to the surface of the cladding.

These advantages are considered to be of great significance in respect to the operational dimensional stability of a thermionic fuel form. The close anode to cathode spacing of thermionic generators demands fuels that will function with minimum dimensional change or distortion and this invention is specifically designed to accomplish this objective.

High temperature, in-pile irradiation data of a qualitative nature has verified the compatibility of uranium dioxide and molybdenum in cermet form. Compatibility in this context encompasses both chemical reaction and solid state diffusion which together define the nature of the high temperature relationships between the fuel particles and the matrix.

Uranium dioxide and molybdenum, when in physical contact, are chemically unreactive in the temperature range from room temperature to the melting point of molybdenum which is approximately 2900° K. Experimental data clearly demonstrates that chemical reaction of uranium dioxide and molybdenum is not a factor in the high temperature relationships concerned. Furthermore, at the operating temperatures discussed herein no substantial solid state diffusion takes place between the uranium dioxide particles and the molybdenum matrix. Diffusion between two solid materials in intimate contact is to be expected at some elevated temperature. The temperature at which the diffusion rate becomes significant, if indeed it does become significant, is far above the operating temperatures of the fuel solid. Thus, in a very practical way and in the practice of this invention an admixture of $UO_2$ particles with metallic molybdenum is a compatible mixture.

Other compatible mixtures of fissionable material containing ceramics with a matrix metal of substantially higher thermal conductivity are, of course, contemplated. In general, matrices of refractory metal or refractory metal alloys are to be preferred. For example, fuel solids otherwise in the nature of that illustrated in FIG. 4 but employing matrices of tungsten or of niobium are acceptable. The fissionable material-containing particles may also be formed of other compositions such as, for example, uranium carbide or uranium nitride.

The selection of specific materials will be affected by such factors as neutron efficiency, designed operating temperatures, uranium density, and the relationships between the materials under operating conditions.

The use of a cermet fuel pellet bushing of the compositions disclosed permits variation of the effective uranium density of the bushing within the upper and lower composition limits of the cermet system. This permissible variation provides considerable latitude with which to balance general properties of the fuel form system such as internal void volume, thermal conductivity of the fuel pellet bushing, temperature of the innermost fuel particles, centerline temperature, uranium density, etc. in order to develop maximum reliability of the thermionic diode.

It can be seen that the novel structures and assemblies described fulfill each of the above-mentioned objects. The practicality of these constructions is underscored by the fact that from such devices output power densities in excess of ten watts per square centimeter can be expected with an overall energy conversion efficiency of over ten percent and with interelectrode spacings sufficiently great to insure long life, highly reliable performance, and ease of fabrication.

Although but one basic structure has been illustrated, a number of illustrative variations have been discussed. It should be obvious that many other variations in structure and execution may occur to those skilled in the art to which this invention pertains. The appended claims are therefore intended to cover all such variations as fall within the true spirit and scope of this invention in its broader aspects.

What is claimed is:

1. A thermionic device for the conversion into electrical energy of nuclear energy released by a fissionable material comprising:
   a tubular anode formed of niobium;
   a cylindrical cathode having a sealed interior chamber positioned concentrically within said tubular anode with an interelectrode gap therebetween, said cathode being formed of a refractory metal composition consisting essentially of a mixture of molybdenum and approximately ½% titanium and having on its outer surface an emitter coating of ruthenium;

a nuclear fuel solid of annular configuration with an axial void on the centerline thereof bonded metallurgically to the interior of said cathode and partially filling said sealed interior chamber, said axial void being evacuated for the collection and containment of fission product gases within said interior chamber, said fuel solid consisting essentially of particles of a fissionable material-containing ceramic composition dispersed in a matrix of molybdenum to promote the transfer of thermal energy through said fuel solid to said cathode; and a cesium vapor located at least partially within said interelectrode gap in operation.

2. A thermionic device for the conversion into electrical energy of nuclear energy released by a fissionable material comprising:

a tubular anode formed of niobium;

a cylindrical cathode having a sealed interior chamber positioned concentrically within said tubular anode with an interelectrode gap therebetween, said cathode being formed of a refractory metal composition consisting essentially of a mixture of molybdenum and approximately ½% titanium and having on its outer surface a cathode of ruthenium;

a nuclear fuel solid of annular configuration metallurgically bonded to the interior of said cathode and partially filling said sealed interior chamber with an axial void on the centerline thereof, said axial void being evacuated for the collection and containment of fission product gases, said fuel solid consisting essentially of particles of a uranium-bearing composition of comparatively low conductivity dispersed in a matrix of molybdenum to promote the transfer of thermal energy through said fuel solid to said cathode; and a cesium vapor located at least partially within said interelectrode gap in operation.

* * * * *